(12) United States Patent
Koutra et al.

(10) Patent No.: US 9,679,247 B2
(45) Date of Patent: Jun. 13, 2017

(54) GRAPH MATCHING

(71) Applicant: International Business Machines Corporation, Armonk, NY (US)

(72) Inventors: Danai Koutra, Pittsburgh, PA (US); David M. Lubensky, Brookfield, CT (US); Hanghang Tong, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 906 days.

(21) Appl. No.: 14/032,105

(22) Filed: Sep. 19, 2013

(65) Prior Publication Data

US 2016/0154895 A1     Jun. 2, 2016

(51) Int. Cl.
*G06N 5/04* (2006.01)
*G06N 5/02* (2006.01)

(52) U.S. Cl.
CPC ............ *G06N 5/022* (2013.01); *G06N 5/048* (2013.01)

(58) Field of Classification Search
None
See application file for complete search history.

(56) References Cited

U.S. PATENT DOCUMENTS

| | | | |
|---|---|---|---|
| 5,117,422 A | 5/1992 | Hauptschein et al. | |
| 6,269,401 B1 | 7/2001 | Fletcher et al. | |
| 6,292,796 B1 | 9/2001 | Drucker et al. | |
| 7,310,551 B1 | 12/2007 | Koh | |
| 7,398,262 B1 | 7/2008 | Curtis | |
| 7,403,910 B1 | 7/2008 | Hastings | |
| 7,454,439 B1 | 11/2008 | Gansner | |
| 7,596,385 B2 | 9/2009 | Aghvami | |
| 7,805,440 B2 | 9/2010 | Farrell | |
| 8,117,254 B2 | 2/2012 | Nirkhe | |
| 8,180,810 B2 | 5/2012 | Chiticarlu | |
| 8,195,734 B1* | 6/2012 | Long | G06F 17/30598 708/520 |
| 2002/0019826 A1 | 2/2002 | Tan | |
| 2005/0176429 A1 | 8/2005 | Lee | |
| 2006/0007864 A1 | 1/2006 | Li | |
| 2006/0136428 A1 | 6/2006 | Syeda-Mahmood | |
| 2006/0150168 A1* | 7/2006 | Mitchell | G06F 12/0253 717/156 |
| 2006/0287910 A1* | 12/2006 | Kuchar | G06N 5/02 706/16 |
| 2007/0109302 A1 | 5/2007 | Tsuboshita | |
| 2008/0033761 A1 | 2/2008 | Brummel | |

(Continued)

OTHER PUBLICATIONS

Steck, H. (2010). "Training and Testing Recommender Systems on Data Missing Not at Random". KDD'10, Jul. 25-28, 2010. pp. 713-722.*

(Continued)

*Primary Examiner* — Paulinho E Smith
*Assistant Examiner* — Benjamin Buss
(74) *Attorney, Agent, or Firm* — Daniel P. Morris; Otterstedt, Ellenbogen & Kammer, LLP

(57) ABSTRACT

A method of building a soft linkage between a plurality of graphs includes initializing a correspondence between type-1 and type-2 objects in the plurality of graphs, and reducing a cost function by alternately updating the type-1 correspondence and updating the type-2 correspondence.

19 Claims, 8 Drawing Sheets

(56) References Cited

U.S. PATENT DOCUMENTS

| | | | |
|---|---|---|---|
| 2008/0306895 A1 | 12/2008 | Karty | |
| 2009/0006431 A1 | 1/2009 | Agrawal | |
| 2009/0055354 A1 | 2/2009 | Arad | |
| 2009/0210363 A1* | 8/2009 | Grabarnik | G06K 9/6247 706/12 |
| 2010/0115391 A1 | 5/2010 | Engel | |
| 2010/0251127 A1* | 9/2010 | Geppert | G06F 3/04817 715/735 |
| 2010/0257089 A1 | 10/2010 | Johnson | |
| 2010/0293090 A1 | 11/2010 | Domenikos | |
| 2011/0016078 A1 | 1/2011 | Clark | |
| 2011/0077973 A1 | 3/2011 | Breitenstein | |
| 2011/0129147 A1* | 6/2011 | Monga | H04N 1/603 382/167 |
| 2011/0173189 A1 | 7/2011 | Singh | |
| 2011/0173264 A1 | 7/2011 | Kelly | |
| 2011/0191832 A1 | 8/2011 | Davis | |
| 2011/0238566 A1 | 9/2011 | Santos | |
| 2011/0310112 A1 | 12/2011 | Zolotovitski | |
| 2011/0314367 A1* | 12/2011 | Chang | G06F 17/30035 715/230 |
| 2012/0029935 A1 | 2/2012 | Iliff | |
| 2012/0066172 A1 | 3/2012 | Jebara | |
| 2012/0072421 A1 | 3/2012 | Bhattacharya | |
| 2012/0083917 A1 | 4/2012 | Zhou | |
| 2012/0117019 A1 | 5/2012 | Wolf | |
| 2012/0137336 A1* | 5/2012 | Applegate | H04N 21/2225 725/95 |
| 2012/0226651 A1 | 9/2012 | Chidlovskii | |
| 2012/0229466 A1 | 9/2012 | Riche | |
| 2012/0259983 A1 | 10/2012 | Nakadai | |
| 2012/0290988 A1 | 11/2012 | Sun | |
| 2012/0307680 A1 | 12/2012 | Kim | |
| 2013/0006880 A1 | 1/2013 | Dey | |
| 2013/0092738 A1* | 4/2013 | Blasinski | G06K 19/0614 235/462.04 |
| 2013/0124449 A1* | 5/2013 | Pinckney | G06N 5/045 706/52 |
| 2013/0343510 A1* | 12/2013 | Jang | G06T 7/0012 378/5 |
| 2014/0025617 A1* | 1/2014 | Kang | G06N 5/04 706/46 |
| 2014/0355901 A1* | 12/2014 | Tezaur | G06T 5/003 382/255 |

OTHER PUBLICATIONS

Carl Kingsford, "CMSC 451: Maximum Bipartite Matching", Department of Computer Science, Oct. 2008, pp. 1-18, University of Maryland, College Park.

B. M. Monjurul Alom et al., "Finding the Maximum Matching in a Bipartite Graph", DUET Journal, vol. 1, Issue 1, Jun. 2010, pp. 1-4, Department of Computer Science and Engineering, Dhaka University of Engineering & Technology, Gazipur, Bangladesh.

Lubomir Bourdev et al., "Describing People: A Poselet-Based Approach to Attribute Classification", IEEE International Conference on Computer Vision, Nov. 2011, pp. 1543-1550, Fira de Barcelona, Barcelona, Spain.

Batul J. Mirza et al., "Studying Recommendation Algorithms by Graph Analysis", Journal of Intelligent Information Systems, Mar. 2003, pp. 1-32.

Robert Ferrell et al., "Dynamic Assembly of Learning Objects", May 2004, pp. 162-169.

Hazeline U. Asuncion, et al., "Capturing Custom Link Semantics among Heterogeneous Artifacts and Tools", May 2009, pp. 1-5, Vancouver, Canada.

Michael K. NG et al., "MultiRank: Co-Ranking for Objects and Relations in Multi-Relational Data", Aug. 2011, pp. 1217-1225, San Diego, California, USA.

Ben London et al., "Multi-relational Weighted Tensor Decomposition", NIPS 2012 Workshop on Spectral Algorithms for Latent Variable Models, Dec. 2012, pp. 1-5, Lake Tahoe, Nevada, USA.

Kim-Ngan T. Nguyen et al., "Discovering Inter-Dimensional Rules in Dynamic Graphs", Jan. 2010, pp. 1-12.

Sutanay Choudhury et al., "Continuous Queries for Multi-Relational Graphs", Aug. 2012, pp. 1-13.

Kai Xu et al., "Semi-Bipartite Graph Visualization for Gene Ontology Networks", Sep. 2009, pp. 1-21.

Hans-Jorg Schulz et al., "Visual Analysis of Bipartite Biological Networks", Eurographics Workshop on Visual Computing for Biomedicine (EG VCBM), Oct. 2008, pp. 1-8, Delft, Netherlands.

Guo-Jun Qi et al., "Link Prediction across Networks by Biased Cross-Network Sampling", 2013 IEEE 29th International Conference on Data Engineering (ICDE), Apr. 2013, pp. 1-12.

Leman Akoglu et al., "OddBall: Spotting Anomalies in Weighted Graphs", Jun. 2010, pp. 1-12.

* cited by examiner

Algorithm 1 Gradient Descent Based Method

INPUT: A, B, $\epsilon$, $\eta_0$
201     $k = 0$         // number of steps
    initialize(P, Q)
206    while $(P^{(k+1)} - P^{(k)} > \epsilon)$ & $(Q^{(k+1)} - Q^{(k)} > \epsilon)$
    do
202/203     $k = k+1$
        $P^{(k+1)} = P^{(k)} - \eta_k \nabla f_{aug}(P^{(k)}, Q^{(k)})$
        validProjection($P^{(k+1)}$)
204     $Q^{(k+1)} = Q^{(k)} - \eta_k \nabla f_{aug}(P^{(k+1)}, Q^{(k)})$
        validProjection($Q^{(k+1)}$)
205     $\eta_{k+1} = updateEta(k)$
    end while
    return $P^{(k+1)}, Q^{(k+1)}$ function INITIALIZE(P, Q)
        //Case 1: uniform / random
        //Case 2: degree-based (fixed block size)
        //Case 3: network-inspired
    end function
    function VALIDPROJECTION(P)
        for all $i, j$ do
            if $P_{ij} < 0$ then
                $P_{ij} = 0$
            else $P_{ij} > 1$ then
                $P_{ij} = 1$
            end if
        end for
    end function
    function UPDATEETA($k$)
        beta = 0.9;
        return $\eta_0 \cdot \beta^{k-1}$;
    end function

*Fig. 2*

GRAPH MATCHING

This invention was made with Government support under Contract No.: W911NF-12-C-0028 (Defense Advanced Research Projects Agency (DARPA)). The Government has certain rights in this invention.

BACKGROUND

The present disclosure relates to graph matching, and more particularly to an alternating and projected procedure for aligning graphs.

The notion of graph similarity and alignment appears in numerous fields, including protein-protein alignment, chemical compound comparison, optical character recognition, information extraction for finding synonyms in a single language or translation between different languages, answering similarity queries in databases, pattern recognition, etc.

Existing methods attempt to solve the graph matching or alignment problem using, for example, probabilistic techniques, genetic algorithms, decision trees, expectation-maximization, clustering techniques, and graph edit distance. The exact algorithms that solve the graph alignment problem are exponential and, thus, inapplicable to the large-scale graphs.

BRIEF SUMMARY

According to an exemplary embodiment of the present disclosure, a method of building a soft linkage between a plurality of graphs includes initializing a correspondence between type-1 and type-2 objects in the plurality of graphs, and reducing a cost function by alternately updating the type-1 correspondence and updating the type-2 correspondence.

According to an exemplary embodiment of the present disclosure, initializing the correspondence between the type-1 and type-2 objects comprises sorting a plurality of node sets based on a degree distribution, clustering the plurality of node sets into at least one cluster, and initializing the type-1 and type-2 objects uniformly for each of the at least one cluster.

According to an exemplary embodiment of the present disclosure, updating the type-1 correspondence comprises fixing a correspondence between type-2 objects, determining a gradient of the type-1 correspondence, updating the type-1 correspondence according to the gradient, and projecting the type-1 correspondence to a feasible region.

According to an exemplary embodiment of the present disclosure, the type-1 correspondence and the type-2 correspondence are each represented as a non-negative matrix whose entries are between 0 and 1.

According to an exemplary embodiment of the present disclosure, at least one community is matched across multiple populations wherein the plurality of graphs corresponding to respective populations, wherein matching the at least one community across multiple populations comprises building a profile for each population, clustering instances of objects in each population into the at least one community, creating a node-community graph for each population, and building a soft mapping between the node-community graphs.

According to an exemplary embodiment of the present disclosure, each profile corresponds to one of an instance represented by an attribute vector and a population represented by a network.

According to an exemplary embodiment of the present disclosure, a soft linkage is built between a plurality of dynamic graphs corresponding to the plurality of graphs, respectively, wherein initializing the correspondence between type-1 and type-2 objects in the plurality of graphs comprises initializing the correspondence between nodes and time stamps in the plurality of graphs, and wherein reducing the cost function by alternately updating the type-1 correspondence and updating the type-2 correspondence includes updating a node correspondence and updating a time-stamp correspondence.

According to an exemplary embodiment of the present disclosure, updating the node correspondence comprises mapping a snapshot in a second graph to each snapshot in a first graph, aggregating mapped clustering each node set into one or more clusters, aggregating the snapshots in the first graph, and finding a node mapping between at least two aggregated snapshots.

According to an exemplary embodiment of the present disclosure, updating the time correspondence comprises re-ordering the nodes in the first graph, measuring a pair-wised similarity between each re-ordered snapshot in the first graph and each snapshot in the second graph, and normalizing the pair-wise graph similarity.

According to an exemplary embodiment of the present disclosure, a soft linkage is built between a plurality of heterogeneous graphs corresponding to the plurality of graphs, respectively, wherein the correspondence between type-1 and type-2 objects in the plurality of graphs is a correspondence between nodes of each type of object, and wherein reducing the cost function by alternately updating the type-1 correspondence and updating the type-2 correspondence including updating a correspondence between the nodes of each type of objects.

According to an exemplary embodiment of the present disclosure, a soft linkage is built between a plurality of multi-relational data sets, wherein the correspondence between type-1 and type-2 objects in the plurality of graphs is a correspondence between nodes of each mode, and wherein reducing the cost function by alternately updating the type-1 correspondence and updating the type-2 correspondence including updating a correspondence between the nodes of each mode.

According to an exemplary embodiment of the present disclosure, entities and ontologies of the plurality of heterogeneous graphs are matched based on structural representations thereof by finding a matching of the structural representations.

According to an exemplary embodiment of the present disclosure, the structural representations include one of graphs, heterogeneous networks and multi-relational data.

According to an exemplary embodiment of the present disclosure, a cross-network search comprises inferring a soft-correspondence between the plurality of graphs, integrating the plurality of graphs into an integrated network, and conducting a search on the integrated networks.

According to an exemplary embodiment of the present disclosure, a cross-network visualization comprises inferring a soft-correspondence between the plurality of graphs, building a matching graph for each soft-correspondence between the plurality of graphs, and building a layout and visualizing of the matching graphs.

According to an exemplary embodiment of the present disclosure, building the matching graph comprises representing the type-1 objects as nodes from a first network, representing the type-2 objects as the nodes from a second network, and determining a plurality of links by a correspondence matrix between the plurality of graphs.

According to an exemplary embodiment of the present disclosure, a cross-network clustering comprises inferring a soft-correspondence between the plurality of graphs, integrating the plurality of graphs into an integrated network, wherein the plurality of graphs include a target network and an auxiliary network, and finding a clustering on the integrated networks.

According to an exemplary embodiment of the present disclosure, communities are detected across different populations represented by the plurality of graphs, wherein detecting communities across different populations represented by the plurality of graphs comprises inferring the soft-correspondence between the plurality of graphs, integrating the networks into an integrated network, and finding a community on the integrated network.

According to an exemplary embodiment of the present disclosure, a cross-network link prediction comprises integrating the plurality of graphs including a target network and an auxiliary network, finding at least one matched pair of nodes in the auxiliary network, extracting a plurality of features for the at least one matched pair of nodes, transferring the plurality of features to at least one target pair of nodes in the target network, and predicting a link between the target pair of nodes in the target network.

According to an exemplary embodiment of the present disclosure, a cross-network classification comprises inferring a soft-correspondence between a popularity of the plurality of graphs including a target network and an auxiliary network, integrating the target network and the auxiliary network into an integrated network, building a classifier on the integrated network, and predicting at least one label for a respective un-labeled node in the integrated network.

According to an exemplary embodiment of the present disclosure, a level of trust is predicted between a pair person in the target domain by representing a trust/distrust relationship in a target domain as a first trust network of the plurality of graphs, representing a trust/distrust relationship in an auxiliary domain as a second trust network of the plurality of graphs, performing a cross-network link prediction, and predicting the level of trust based on the cross-network link prediction of a target pair in the plurality of graphs.

According to an exemplary embodiment of the present disclosure, predicting the level of trust based on the cross-network link prediction of the target pair in the plurality of graphs comprises predicting trust if a link between the target pair exists, and predicting distrust if the link between the target pair does not exist.

According to an exemplary embodiment of the present disclosure, predicting a fraud cross different domains of the plurality of graphs, wherein data within each domain is represented as the plurality of graphs, respectively, comprises performing a classification across the plurality of graphs, and predicting a fraud based on a classification result.

According to an exemplary embodiment of the present disclosure, the graphs are one of bipartite graphs and uni-partite graphs.

According to an exemplary embodiment of the present disclosure, a method for aligning a plurality of graphs, each of the plurality of graphs representing a network of objects includes initializing a correspondence between type-1 objects and type-2 objects in each of the plurality of graphs, updating, alternatively, a type-1 correspondence and a type-2 correspondence according to a gradient descent function, and identifying at least one object of a first graph of the plurality of graphs matched to at least one object of a second graph of the plurality of graphs according to the gradient descent function.

BRIEF DESCRIPTION OF THE SEVERAL VIEWS OF THE DRAWINGS

Preferred embodiments of the present disclosure will be described below in more detail, with reference to the accompanying drawings:

FIG. 2 is an illustration of an exemplary algorithm for performing the method shown in FIG. 1 according to an exemplary embodiment of the present disclosure;

DETAILED DESCRIPTION

Finding similar entities across multiple networks can prove to be equally or more important than spotting the same entity across the networks. In both cases, this information can be used to perform better transfer learning tasks between the aligned graphs.

In some embodiments of the present disclosure, the problem of finding similar entities across multiple networks is defined as follows: given two graphs, $G_A$ ($V_A, \epsilon_A$) and $G_B$ ($V_B, \epsilon_B$)—where V and $\epsilon$ are the nodes and edges sets respectively, how can their nodes be permutated or re-ordered so that the graphs have as much similar structure as possible?

According to some embodiments of the present disclosure, a constrained optimization problem is applied for aligning bipartite graphs using a fast, alternating gradient-descent method to solve the graph-matching problem. Preliminary experiments show advantages over some state-of-the-art methods in terms of accuracy of matching, and run-time.

In the present disclosure, the various symbols are defined as follows:

| Notation | Description |
| --- | --- |
| A, B | adjacency matrix of bipartite graph $G_A$, $G_B$ |
| $A^T$, $B^T$ | transpose of matrices A and B |
| $V_A$ | nodes set of graph A |
| $\epsilon_A$ | edges set of graph A |
| P | node-level correspondence matrix |
| Q | community-level correspondence matrix |
| $P^{(v)}$ | row or column vector of matrix P |
| 1 | vector of 1 s |
| $\|A\|_F$ | $=\sqrt{Tr(A^T A)}$, Frobenius norm of A |
| $\lambda$, $\mu$ | penalty parameters for non-sparsity |
| $\eta$ | step of gradient descent |
| $\epsilon$ | convergence constant of gradient descent |

Figure 1:
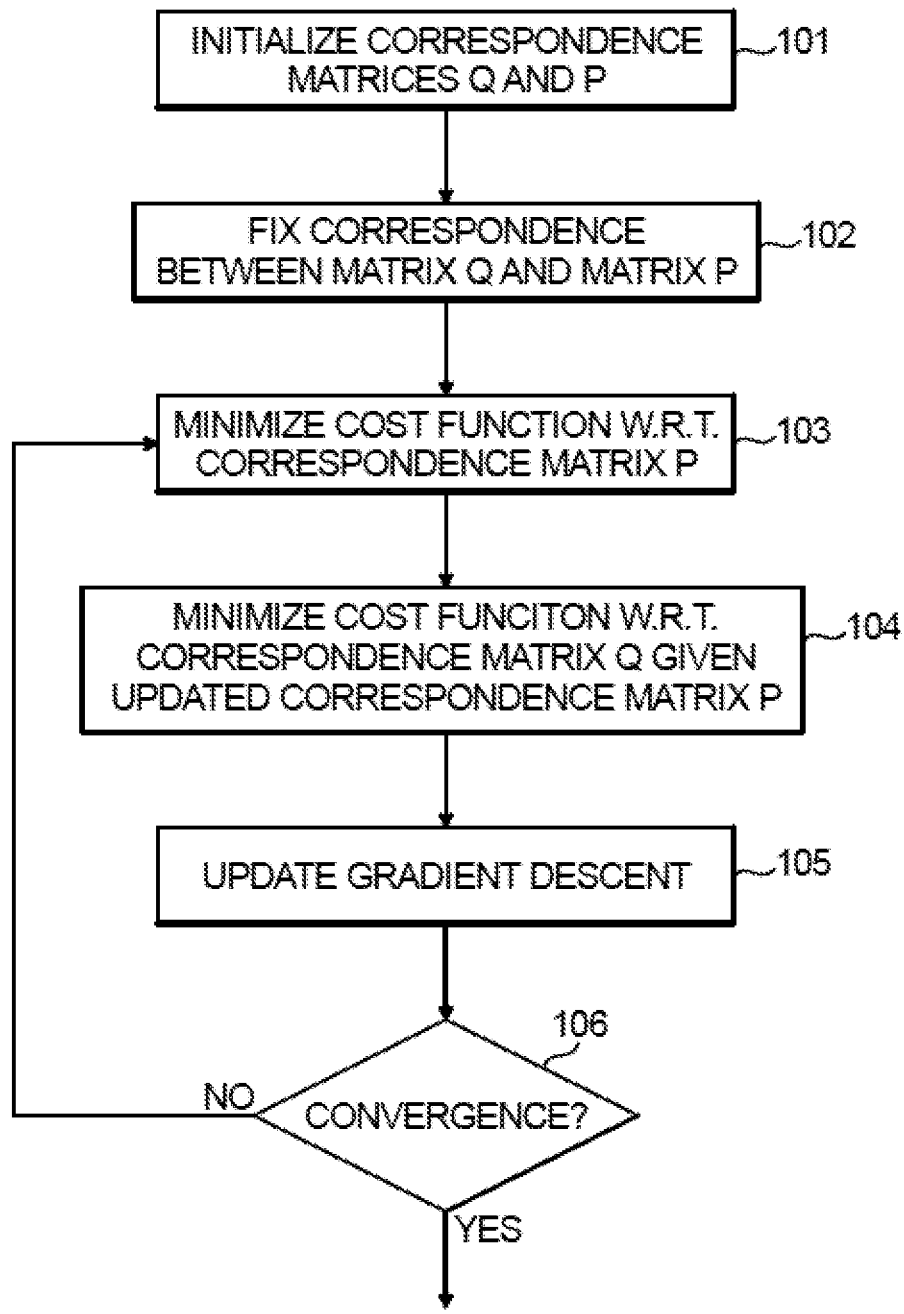
FIG. 1 is a flow diagram of a method for graph matching according to an exemplary embodiment of the present disclosure.

Referring now to FIG. 1, and FIG. 2 (exemplary Algorithm 1); two correspondence matrices Q and P are initialized at block 101, at block 102 correspondence matrix Q is fixed, at block 103 a cost function is minimized with respect to correspondence matrix P. At block 104 the new value of P is used as a constant and the cost function is minimized with respect to correspondence matrix Q. At block 105 a gradient descent. At block 106 the method tests for convergence.

By way of describing exemplary embodiments of the present disclosure, consider the following problem in which given two bipartite graphs, $G_A$ and $G_B$ with adjacency matrices A and B, to find the permutation matrices P, Q that minimize the cost function $f$:

$$\min_{P,Q} f(P, Q) = \min_{P,Q} \|PAQ - B\|_F^2.$$

so that the following constraints are satisfied: 1) each matrix element is a probability (which can be expressed as $0 \leq P_{ij} \leq 1$ and $0 \leq Q_{ij} \leq 1$), and 2) the matrices are sparse (which can be expressed as $\|P^{(v)}\|_0 \leq k$ and $\|Q^{(v)}\|_0 \leq k$ for some small, positive constant k).

Suppose that A is the "who-belongs-to-which-group" Network L graph, and B is the "who-belongs-to-which-group" Network F graph. The optimization problem given in 1 (see below) involves finding how to permute the nodes, P, of Network L, as well as its communities, Q, so that its structure matches as much as possible the structure of the Network F graph.

Existing approaches do not distinguish the nodes in types, and their goal is to find one permutation matrix, say P', which gives the hard matching between the two input graphs. One advantage of the exemplary methods described herein is that they provide for correspondences at different granularities at once (e.g., individual and community level matching in the case of a "who-belongs-to-which-community" graph).

A probabilistic constraint lends a probabilistic interpretation to the node matching: the entries of the correspondence matrix P (or Q) describe with what probability one person (or community) of Network L corresponds to a person (or group) of Network F. Requiring non-integer solutions for the matrices (a) renders the optimization problem easier to solve, and (b) has an improved interpretation in the large networks that are of interest; it does not provide only 1-to-1 correspondence, but also reveals similarities between entities (e.g., people/communities) across networks.

A sparsity constraint follows from the first constraint and the large size of the graphs that are of interest. Sparse correspondence matrices can be easier to work with because they encode fewer possible correspondences per node. Allowing every person/group of Network L to be matched to every person/group of FACEBOOK may not be realistic and, can be problematic when considering very large (e.g., billions of nodes) graphs.

According to an exemplary embodiment of the present disclosure, a graph matching method minimizes a cost function, $f$, under the probabilistic constraint and the sparsity constraint. In order to solve the optimization problem, the sparsity constraint (which is represented mathematically with the l0 norm of the correspondence matrices, and counts the numbers of non-zeros) is relaxed by replacing it with the $l_1$-norm: $\Sigma_i |P_i^{(v)}| = \Sigma_i P_i^{(v)}$ (where we used the non-negativity constraint). Therefore, the sparsity constraint now has the form: $\Sigma_{i,j} P_{ij} < k$ and $\Sigma_{i,j} Q_{ij} < k$.

According to an exemplary embodiment of the present disclosure, the probabilistic constraint that is imposed is not encoded in the cost function to be minimized, but a projection technique is used: if an entry of the correspondence matrices P and Q is below 0 (for example, written as, $P_{ij} < 0, Q_{ij} < 0$), we project it to 0, and if it is above 1, we project it to 1 (for example, written as, $P_{ij} > 1, Q_{ij} > 1$).

Based on the discussion above, the following augmented cost function for the bipartite graph matching problem can be obtained: To find the alignment between the input graphs, $G_A$ and $G_B$, under the probabilistic and sparsity constraints, an optimization problem is solved with the augmented function $f_{aug}$:

$$\min_{P,Q} f_{avg}(P, Q) = \min_{P,Q} \left\{ \|PAQ - B\|_F^2 + \lambda \sum_{i,j} P_{ij} + \mu \sum_{i,j} Q_{ij} \right\} \quad (1)$$

$$= \min_{P,Q} \{Tr(PAQ(PAQ)^T - 2PAQB^T) + \quad (2)$$

$$\lambda 1^T P 1 + \mu 1^T Q 1\}, \quad (3)$$

where A and B are the corresponding adjacency matrices of the graphs, P is the node-level correspondence matrix, Q is the community-level correspondence matrix, $\lambda$ and $\mu$ are the penalty parameters for sparseness of P and Q respectively, and $\|\odot\|_F$ is the Frobenius norm of the enclosed matrix.

Referring again to FIG. 1, the bipartite graph-matching problem can be described in pseudo code as in Algorithm 1 (see FIG. 2). Thus, referring to FIG. 1 and FIG. 2, the cost function is bivariate and an alternating procedure is used to minimize it. At block 102 one of the correspondence matrices (e.g., Q) is fixed, and the cost function with respect to the other (e.g., P), is minimized using the gradient descent approach at block 103 (see also lines 202/203, FIG. 2). Using the new value of P as constant, the cost function with respect to Q is minimized at block 104 (see also line 204, FIG. 2). In this process the gradient descent algorithm can lead to correspondence matrices that have entries that are out of range (i.e., not probabilities). To account for these temporary violations of the probabilistic constraints, during the alternating procedure, the entries of the correspondence matrices are projected back to the valid range. The gradient descent method at block 105 (see also line 205, FIG. 2) converges to the minimum following the direction of the derivative at block 106 (see also line 206, FIG. 2). Therefore, the derivatives of the augmented function, $f_{aug}$, are determined with respect to (w.r.t.) both correspondence matrices P and Q.

The update steps (blocks 103 and 104) for the node and community-level correspondence matrices of the alternating gradient descent approach are given by the formulas:

$$P^{k+1} = P^k - \eta \cdot 2(P^k A Q^k - B) Q^{k^T} A^T + \lambda 1 1^T$$

$$Q^{k+1} = Q^k - \eta \cdot 2 A^T P^{k+1^T} (P^{k+1} A Q^k - B) + \mu 1 1^T,$$

where k is the iteration of the gradient descent algorithm, P(k) (or Q(k)) is the value of the correspondence matrix at iteration k, $\eta$ is the step of the gradient descent, A and B are the adjacency matrices of the graphs, $\lambda$ and $\mu$ are the penalties for the non-sparsity of the correspondence matrices, and 1 is the all-1 column-vector.

In the above formulas it is assumed that A and B are the adjacency matrices of the bipartite graphs: that is, if there are $n_A$ people connected to $m_A$ groups, then the size of A will be $n_A \times m_A$, and will have 1 if a person is a member of corresponding group. In case the adjacency matrix has size $(n_A + m_A) \times (n_A + m_A)$ then the optimization problem that we need to solve is different from one we gave above. The new optimization problem is provided in the following proposition:

If the rectangular adjacency matrices of the bipartite graphs are converted to square matrices, then the objective function for the coupled matrix P* needs to be minimized where:

$$P^* = \begin{pmatrix} P & 0 \\ 0 & Q^T \end{pmatrix}.$$

That is, the problem can be restated as:

$$\min_{P,Q} \|P^* A P^{*T} - B\|_F^2.$$

Referring to block 101 of FIG. 1 and line 201, FIG. 2, in the initialization of the correspondence matrices, the choice of the initial solution is important for the gradient descent algorithm, since it defines the local minimum to which the algorithm will converge. There are several different ways of initializing the node and community level correspondence matrices of the input bipartite graphs. These include, for example, a random method, an eigenvalue-based method, an NMF-based graph matching, a degree-based method and a network-inspired method.

In the random case, the correspondence matrices P and Q are initialized uniformly. In other words, it is assumed that every node in graph A (say, Network L user) can be matched to any node in graph B (say, Network F user) with the same probability.

For purposes of illustration, the degree-based method and network-inspired method are presented in the case of a graph-matching problem between two different networks. Since the initialization of the node-level (P) and community-level (Q) correspondence matrices is the same, a description is provided only for the users matching initialization across the two social networks.

In the degree-based method, (i) sort the degrees of the users of both graphs in descending order, (ii) divide them in blocks of the same size (except for the last block which might be rectangular)—the number of blocks is defined by the user, and (iii) initialize uniformly the diagonal blocks. This approach contains two extreme cases: (a) if the block size is set to 1, then the random case results, and, on the other hand, (b) if the two graphs have the same number of distinct degrees, say N, and set the block size to N, then only users that are linked to the same number of groups (or more generally, only nodes that have the same degree) will be initialized as potential matches.

Figure 5:
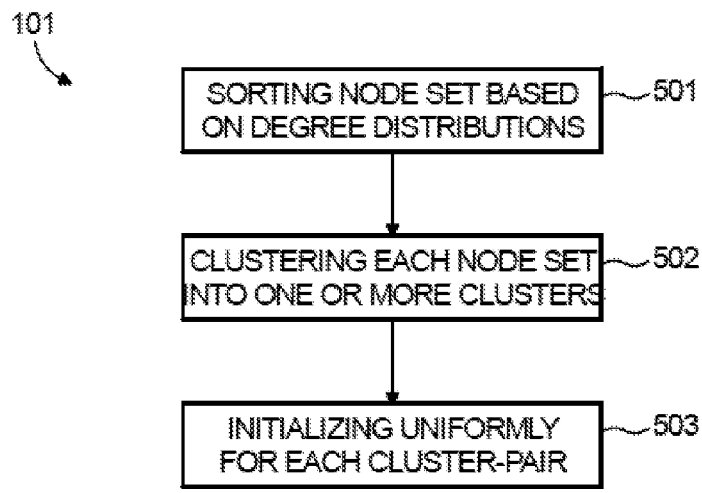
FIG. 5 is a flow diagram of a method for initializing graph matching according to an exemplary embodiment of the present disclosure.

The network-inspired method, as illustrated in FIG. 5, is based on the observation on large-scale graphs that real networks have skewed or power-law-like degree distribution. Equivalently, only a few nodes in a graph have very high degree, while most of them have small degrees.

Figure 3:
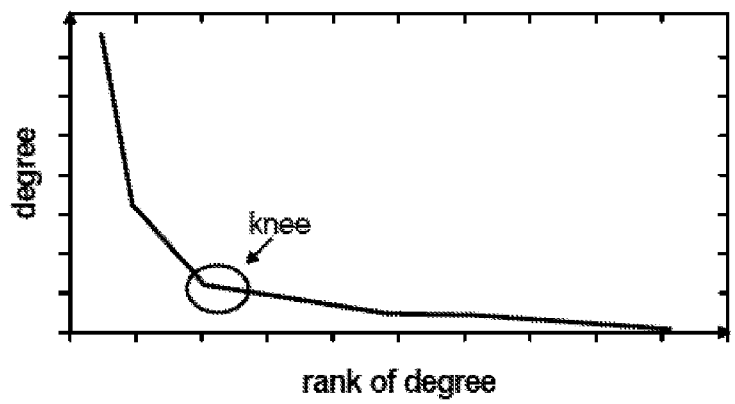
FIG. 3 a plot for the network-inspired initialization according to an exemplary embodiment of the present disclosure.

Based on this observation, a initialization technique is disclosed in which a node set is sorted based on degree distributions (see 501, FIG. 5). The method further includes determining the top-k high degree users in the Network L and Network F graph and matched 1-by-1. To find k, the unique degrees in each graph are found and sorted in descending order to create a plot with the degree of the node in the y-axis, and its rank on the x-axis (FIG. 3). In this plot, the "knee" is detected and up to the corresponding degree, the users of the two graphs are matched one-by-one, e.g., the most popular user of Network L is initialized to match with the most popular user of Network F and so on. To automatically detect the knee in the plot, the slope of the piecewise lines are determined, and if a slope is less than a threshold (e.g., 10% of the previous slope), then it is assumed that the number of nodes to match one-by-one has been found.

Figure 4:
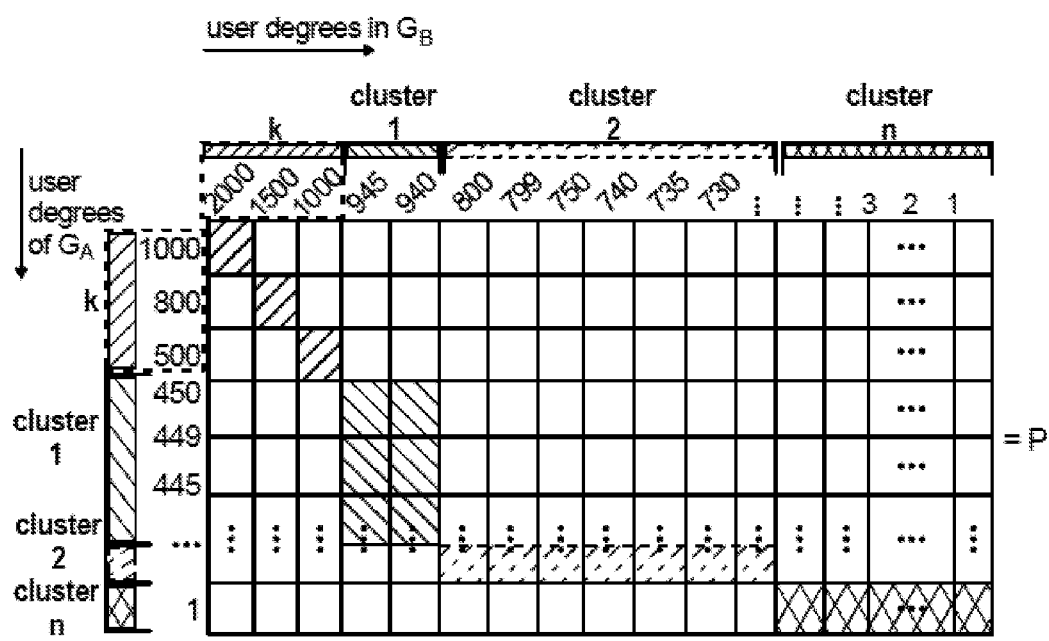
FIG. 4 illustrates a network-inspired initialization with a pictorial initialization of a node-level correspondence matrix according to an exemplary embodiment of the present disclosure.

At block 502 of FIG. 5 the initialization technique the rest of the users degrees in both networks are clustered (see FIG. 4). At block 503, FIG. 5, the users of the first Network L cluster are matched to the users of the first Network F cluster with the same probability. That is, the "high" degree users of Network L are uniformly initialized to match to the "high" degree users of Network F, the "medium" degree Network L users to the "medium" degree Network F users, etc.

In the network-inspired initialization technique, nodes that have similar degrees are initially matched. Implicitly, it is assumed that each user is almost equally popular among different networks, or more generally, that the nodes have almost the same degree in the input graphs. Other methods, such as the fixed-block, degree-based method, are possible.

Embodiments of the present disclosure are applicable to, for example, bipartite graphs. Bipartite graphs have links between disjoint sets of nodes (e.g., users and groups). Although this formulation appears to be restriction, it is not the case for several reasons. For example, bipartite graphs are ubiquitous. Some examples include users-to-files, authors-to-papers, customers-to-products, users-to-messages/emails/groups/photos. Exemplary methods enable coupled alignment, wherein nodes can be matched both on individual level, as well as community level. Furthermore, it is possible to convert every unipartite graph to bi-partite by doing clustering and creating graphs of the form: nodes-to-communities/clusters. Moreover, bipartite graphs are general and can be applied to cloud-of-points matching. Specifically, features can be extracted from nodes, a node-to-feature graph created, and the bipartite graph matching applied. The bipartite graphs can be extended to tensors, e.g., multi-dimensional matrices. This way, graph matching can be applied to time-evolving graphs.

Turning now to an exemplary experiment, algorithm 1 is implemented in Matlab. Experimental data includes the IMDb (Internet Movie Database) network, which includes the following bipartite sub-networks: actor-genre, actor-movie, movie-genre, and actor-country. From these networks sub-graphs with 50-1000 nodes are extracted. Random, noiseless and noisy permutations with noise up to 40% are created from the network sub-graphs. The noise is inverting edges; if an edge exists it is deleted; if it does not exist, then an edge is inserted.

Algorithm 1 includes parameters including $\epsilon$, which determines the convergence, $\eta$, which is the step of the gradient descent algorithm and also determines the convergence rate, and $\lambda$ and $\mu$, which are penalty parameters for non-zero elements in the correspondence matrices.

Referring to the convergence parameter, $\epsilon$, this parameter determines the convergence of algorithm 1. If it is large, then the algorithm converges quickly. On the other hand, if it is small, then the runtime increases and numerous iterations are needed. Therefore, a value is selected (e.g., by a user) that is suitable for an application. In some exemplary embodiments, a convergence parameter, $\epsilon$, with a value of 10-5 or 10-6 is sufficient in terms of iterations and runtime.

Referring to the gradient descent step parameter, this parameter is the step of the gradient descent algorithm and also determines the convergence rate. For this parameter, a large value leads to faster solutions, but can also cause oscillation around the solution, without ever reaching it. On the other hand, a small value for $\eta$ leads to slow convergence rate. In some exemplary embodiments, a large step is initially used, and at each iteration it is reduced by a factor. For example, the process at each iteration can be described by: $\eta = \eta_0 \beta^{iteration+1}$, where $\beta = 0.9$, or more generally a number in (0, 1).

Referring to the penalty parameters $\lambda$: $\lambda$ and $\mu$ are penalty parameters for non-zero elements in the correspondence matrices. The larger these parameters are, the more entries of the matrices are forced to be 0. The user should be cautious not to set these parameters too large, since this will lead to all zero matrices. In experimental implementations only $\lambda$ is free (selected by the user).

The penalization ensures that the same amount of penalty is applied to each non-zero element in P and in Q, respectively. So that in the case one matrix (e.g., P) is much bigger than the other (e.g., Q), the penalty of P will not overwhelm that of Q.

Exemplary implementations can be run on one or more machines. In a multi-machine implementation, exemplary implementations can be parallelized by splitting the optimization problem into smaller sub-problems by decomposing the matrices, and doing column-row multiplications. Moreover, a variant method, the stochastic gradient descent, which is based on sampling, can replace the gradient descent method.

While the present disclosure details methods applicable to bipartite graphs, the primitive also handles the case of unipartite graphs.

It should be understood that the methodologies of embodiments of the disclosure may be particularly well-suited for predicting service delivery metrics using projected system configurations, load, and performance.

By way of recapitulation, according to an exemplary embodiment of the present disclosure, a method for graph matching including building a soft linkage between a plurality of bipartite graphs by initializing a correspondence between type-1 and type-2 objects in the plurality of bipartite graphs, and reducing a cost function by alternately updating the type-1 correspondence and updating the type-2 correspondence. For example, in the exemplary case shown in FIG. 7, an author, a conference and a term are considered as three different types of objects (e.g., author as type-1 object, conference as type-2 object and term as type-3 object) in the input networks A and B. The correspondences are determined for the same types of objects across different networks. So, in this example, type-1 correspondence is the correspondence for different sets of authors (e.g., the correspondence between all the authors from a first network A and all the authors from a second network B).

According to an exemplary embodiment of the present disclosure, initializing the correspondence between the type-1 and type-2 objects comprises sorting a plurality of node sets based on a degree distribution, clustering the plurality of node sets into at least one cluster, and initializing the type-1 and type-2 objects uniformly for each of the at least one cluster.

According to an exemplary embodiment of the present disclosure, updating the type-1 correspondence comprises fixing a correspondence between type-2 objects, determining a gradient of the type-1 correspondence, updating the type-1 correspondence according to the gradient, and projecting the type-1 correspondence to a feasible region.

According to an exemplary embodiment of the present disclosure, the type-1 correspondence and the type-2 correspondence are each represented as a non-negative matrix whose entries are between 0 and 1.

Support for the foregoing, to determine the partial derivatives of $f_{aug}(P,Q)$ w.r.t. P and Q, one may determine the derivatives of the non-augmented cost function $f(P,Q)$ w.r.t. P and Q. The results follow:

Lemma 1: The minimization of $f$ can be reduced to:

$$\min_{P,Q} \{\|PAQ\|_F^2 - 2TrPAQB^T\}$$

Proof: By definition, the Frobenius norm of PAQ−B is given by:

$$\|PAQ-B\|_F^2 = Tr(PAQ-B)(PAQ-B)^T.$$

Such that, $$\|PAQ-B\|_F^2 = Tr(PAQ(PAQ)^T - PAQB^T - B(PAQ)^T + BB^T)$$
$$= \|PAQ\|_F^2 - 2TrPAQB^T + BB^T$$

where the fact that $TrPAQB^T = Tr(PAQB^T)^T = TrPAQB^T$ can be used. Notice that the last term does not depend on P or Q, so it can be excluded from the formula we want to minimize.

Lemma 2: The derivative of $f$ w.r.t. P is given by:

$$\frac{\partial f}{\partial P} = 2(PAQ-B)Q^T A^T$$

Proof:

$$\frac{\partial(\|PAQ\|_F^2 - 2TrPAQB^T)}{\partial P} = \frac{\partial(TrPAQQ^T A^T P^T - 2TrPAQB^T)}{\partial P}$$

-continued $$= \frac{\partial (TrPAQQ^T A^T P^T)}{\partial P} - 2\frac{\partial (TrPAQB^T)}{\partial P}$$

$$= P(AQQ^T A^T) + P(AQQ^T A^T)^T - 2(AQB^T)^T$$

$$= 2PAQQ^T A^T - 2BQ^T A^T$$

$$= 2(PAQ - B)Q^T A^T$$

In view of the foregoing, given the orthogonality constraints, i.e., $PP^T = I$ and $QQ^T = I$, then the above formula can be rewritten as:

$$\frac{\partial f}{\partial P} = 2(PA - BQ^T)A^T$$

Lemma 3: The following equality holds:

$$TrPAQQ^T A^T P^T = TrA^T P^T P^T PAQQ^T$$

because the trace is invariant under cyclic permutations.

Lemma 4: The derivative of the cost function, $f$, w.r.t. Q is given by:

$$\frac{\partial f}{\partial Q} = 2A^T P^T (PAQ - B)$$

Proof: By using properties of matrix derivatives, obtain the partial derivative of the cost function, $f$, w.r.t. Q is given by:

$$\frac{\partial (\|PAQ\|_F^2 - 2TrPAQB^T)}{\partial Q} = \frac{\partial (TrPAQQ^T A^T P^T - 2TrPAQB^T)}{\partial Q}$$

$$= \frac{\partial (TrPAQQ^T A^T P^T)}{\partial Q} - 2\frac{\partial (TrPAQB^T)}{\partial Q}$$

$$= \frac{\partial (A^T P^T PAQQ^T)}{\partial Q} - 2\frac{\partial (TrPAQB^T)}{\partial Q}$$

$$= (A^T P^T PA + (A^T P^T PA)^T)Q - 2(PA)^T (B^T)^T$$

$$= 2A^T P^T PAQ - 2A^T P^T B$$

$$= 2A^T P^T (PAQ - B)$$

The partial derivative of the penalty term in the cost function w.r.t. P can be rewritten as:

$$\frac{\partial 1^T P1}{\partial P} = 11^T$$

The partial derivative of the penalty term in the cost function w.r.t. Q can be rewritten similarly.

Applications of the foregoing methods include the ability to perform just-in-time analysis of networks without requiring that access to raw data (e.g., the full set of network data) and rapid time-to-value analysis.

Referring to the example of just-in-time analysis, according to an embodiment of the present disclosure, graph analytics is performed on the fly, even when customer data can't be persisted (e.g., in some scenarios access raw data is prohibited or is available only for a limited time when analytics are run, and then removed/isolated from the rest of the system/solution) by moving analytics to data.

In some exemplary embodiments, graph analytics can be performed in privacy sensitive application domains. For example, financial institutions have difficulty sharing data for a verity of reasons (e.g., legislation, privacy policies, etc.), rendering fraud detection a difficult task; according to an embodiment of the present disclosure targeted data, as compared to raw data, from different sources is integrated together for running analytics collectively; e.g., a few known labels (e.g., examples of known fraud, etc.) across different financial institutions and/or networks run through exemplary methods described herein enables improved fraud detection accuracy.

Referring to the example of rapid time-to-value analysis, by integrating/extracting data from heterogeneous graphs clients are enabled to run analytics as business requirements rapidly change. For example, in an exemplary case where a client collects customer data and different Line of Business (LOBs) teams have different needs for the type of analytics they may want to run, it may not be practical or cost-effective to have multiple copies of the raw data. According to an exemplary embodiment of the present disclosure, the different LOB's can run the analytics, evaluate the outcomes of their marketing campaigns/strategy and iterate rapidly. This form of self-service analytics reduces time-consuming ETL (Extract, Transform, and Load) processes, the expense of data curation and running the analytics. According to an exemplary embodiment of the present disclosure, data is kept in raw form in one data repository (e.g., as a graph), and the analytics are executed rapidly and accurately by teams that run the different businesses.

Additional exemplary and non-limited embodiments and implementations presented hereinafter include methods for cross-population community alignment, methods for matching dynamic networks, methods for linking heterogeneous networks builds a soft linkage between two heterogeneous graphs/networks, methods for linking multi-relational data sets, methods for explorative cross-network data analytics and methods for predictive cross-network data analytics.

According to an exemplary embodiment of the present disclosure, a method for cross-population community alignment includes building a profile for each population, clustering the instances/persons in each populations into one or more communities, setting up node-community bipartite graph for each population, and building the soft mapping between all available node-community bipartite graphs. Each profile corresponds to a person represented by his/her attribute vector or to a whole population represented by a network.

Figure 6:
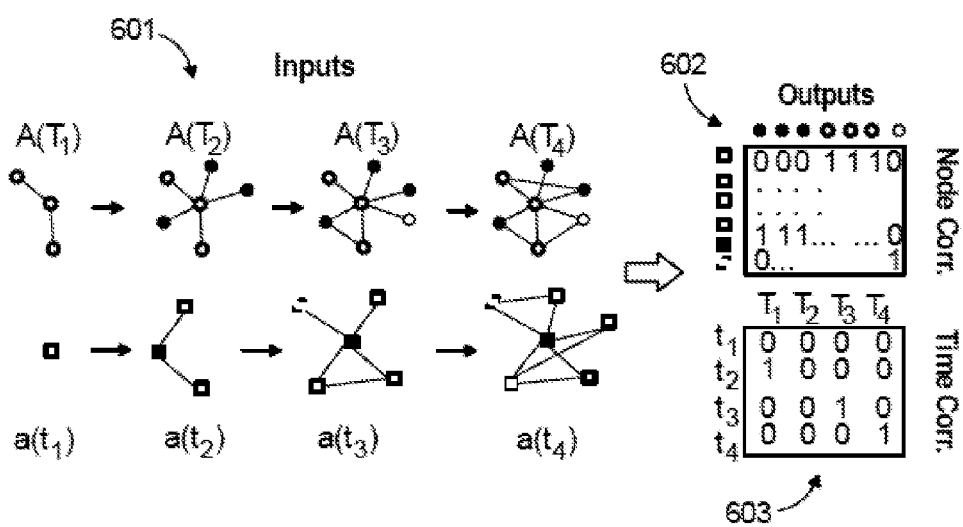
FIG. 6 is an illustration of a method for matching dynamic networks according to an exemplary embodiment of the present disclosure.

According to an exemplary embodiment of the present disclosure, a method for matching dynamic networks (see FIG. 6) includes building soft linkage between two dynamic graphs/networks. As shown in FIG. 6, the method includes initializing a correspondence between the nodes and time stamps 601 and updating the node correspondence at 602 and updating the time stamp correspondence at 603.

Exemplary applications of the dynamic graphs include (a) social networks: egonets (see for example, Akoglu et al.: oddball: Spotting Anomalies in Weighted Graphs, PAKDD (2), June 2010: 410-421) of authors over time in co-authorship network; and (b) healthcare settings: Medical records (symptoms, fMRI scans) of patients.

The updating of the node correspondence 602 includes mapping each snapshot in the second graph to each snapshot in the first graph, aggregating the mapped clustering each node set into one or more clusters, aggregating the snapshots in the first graph, and finding the node mapping between the two aggregated snapshots.

The updating of the time correspondence 603 includes re-ordering the nodes in the first graph, measuring the pair-wised similarity between each of the permutated snapshot from the first graph and each snapshot in the second graph, and normalizing the pair-wise graph similarity.

In view of the forgoing, P: Node Correspondence Matrix and Q: Time Stamp Correspondence Matrix can be written as follows:

$$P = \operatorname{argmin} \sum_{i=1}^{T} \left| PA_i P^T - \sum_{j=1}^{T} Q(i,j) B_j \right|_{fro}^2$$

$$Q = \frac{sim(PA_i P^T, B_j)}{\max(sim(PA_i P^T, B_j))}$$

Various applications of methods for matching dynamic networks are possible. These include building alignment of disease across different patients, which consist of representing each patient as a dynamic/time evolving graph/network; and building correspondence between different dynamic networks. For example each patient is represented as a dynamic/time evolving graph/network, which consists of representing the medical record of a given patient at a given time stamp as a graph/network snap-shot. Here, the graph/network snap-shot is constructed with nodes representing the symptoms and links/edges representing the co-occurrence of symptoms.

According to an exemplary embodiment of the present disclosure, a method for linking heterogeneous networks builds a soft linkage between two heterogeneous graphs/networks. The method includes initializing the correspondence between the nodes/instances of each type of objects and updating the correspondence between the nodes/instances of each type of objects.

In this example, the inputs include (1) a set of relationship $A_{i,j}$, between object i and object j from one domain and (2) a set of relationship $B_{i,j}$, between object i and object j from another domain. The method outputs $P_i$: correspondence between the $i^{th}$ object across two domains, where $$P = \operatorname{argmin} \sum_{i=1}^{T} |P_i A_{i,j} P^T - B_{i,j}|_{fro}^2 \text{ where } (i = 1, \ldots, k).$$

Applications of the multi-relational data/tensors include collaboration networks: <author, paper, conf., term, citation>; and (b) healthcare settings: <patient, physician, visit, symptom, lab test>.

According to an exemplary embodiment of the present disclosure, a method for linking multi-relational data sets (see FIG. 7 and FIG. 8) includes building a soft linkage between two multi-relational data sets/tensors. The method includes initializing the correspondence between the nodes/instances of each mode and updating the correspondence between the nodes/instances of each mode.

Figure 7:
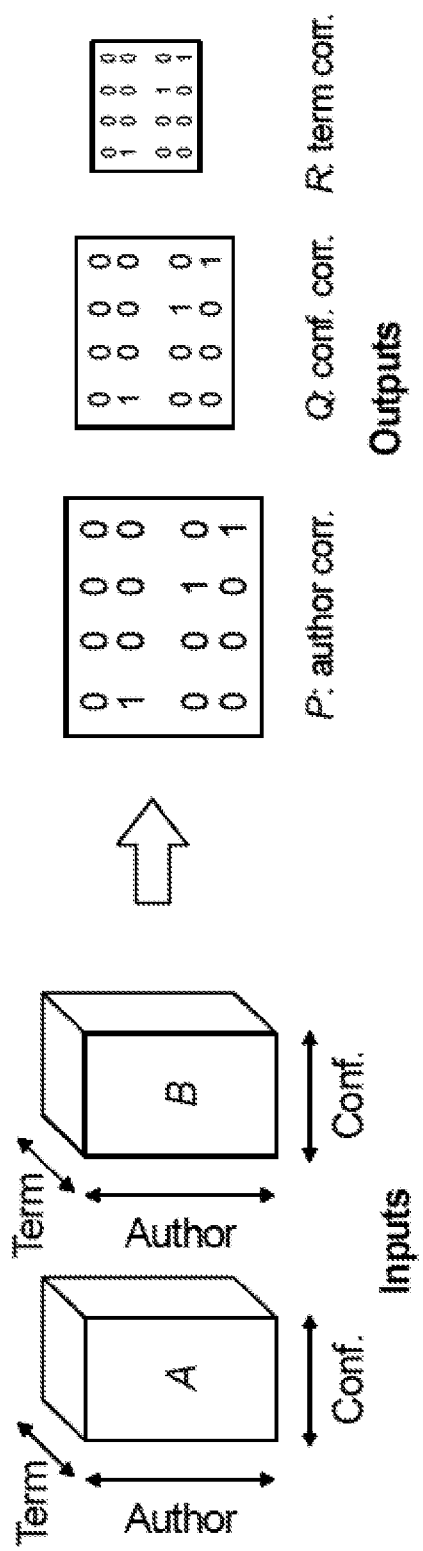
FIG. 7 is an illustration of a method for building soft linkage between two multi-relational data sets/tensors according to an exemplary embodiment of the present disclosure.

FIG. 7 is an illustration of how to match two multi-relational data sets (two tensors): on the left side, there are two 3-d tensors (or two three-way relational data sets) that we aim to match; on the right side, there are desired output for matching—one matrix for one side matching across two data sets (two tensors)

Applications of the multi-relational data/tensors include (a) social networks: <author, conf, term> (see FIG. 7); (b) the web: ; and (c) sensor networks: <location, type, time>

In another exemplary application, entity and ontology are matched based on the structural representation, which includes finding the matching of its structural representation.

The structural representation can include bipartite graphs, heterogeneous networks/graphs, and multi-relational data/tensors.

Figure 8:
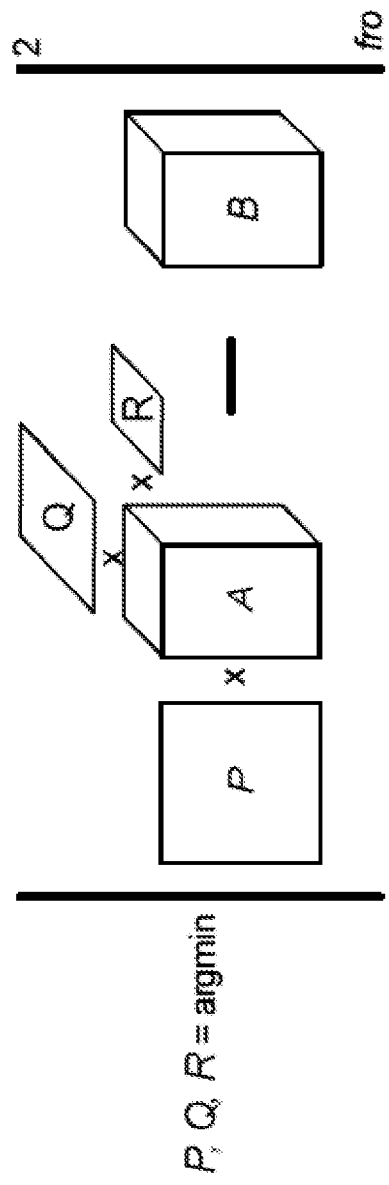
FIG. 8 is an illustration of a method for building soft linkage between two multi-relational data sets/tensors according to an exemplary embodiment of the present disclosure.

FIG. 8 is an illustration of how to formulate the matching problem in FIG. 7; this is the objective function to be minimized and the intuition is that after re-ordering the first data set/tensor according to the matching results (reflected by three tensor-matrix multiplication), the resulting new tensor agree with the 2nd tensor as much as possible.

According to an exemplary embodiment of the present disclosure, a method for explorative cross-network data analytics includes a cross-network search conducted by inferring the soft-correspondence between the input (>=two) networks; integrating the input networks into one single network; and conducing search on the integrated networks.

Applications include (a) finding a "virtual" identity twin, for example, between <FACEBOOK, TWITTER>; <Co-author Network, IMDB Movie Network>; <identity number in the United States of America, identity number in the Europe Union>, <communication network, FACEBOOK>, etc., and (b) cross information-social networks search.

Figure 9:
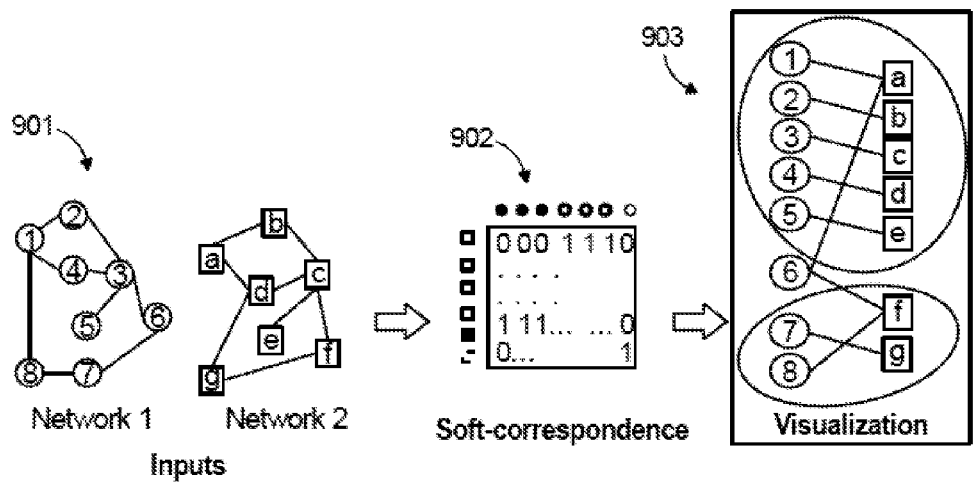
FIG. 9 is an illustration of a method for conducting cross-network visualization according to an exemplary embodiment of the present disclosure.

An exemplary method of cross-network visualization (see FIG. 9) includes inferring the soft-correspondence between the input networks (901), building a matching bipartite graph for each soft-correspondence between the plurality of bipartite graphs (902), performing a layout and visualizing the matching bi-partite graphs (903). The bipartite graph/network is built with type-1 objects being the nodes from the first network; type-2 objects being the nodes from the second network; and links/edges being determined by the correspondence matrix.

At block 902, one or more matching bipartite graph is inferred, which characterizes the soft correspondence between the input networks (e.g., a plurality of bipartite graphs). Given multiple input networks, multiple matching (bi-)partite graphs will be inferred.

In an exemplary implementation, relevant experts are found from a social network for a piece of information from an information network by representing experts as nodes in the social networks; representing the query information as nodes in information network; and conducting cross-network search.

In another exemplary implementation, to collectively visualize information and experts that are from different sources/domains, entities/experts are represented as a social network, the information is represented as an information network, and a cross-network visualization is conducted.

Figure 10:
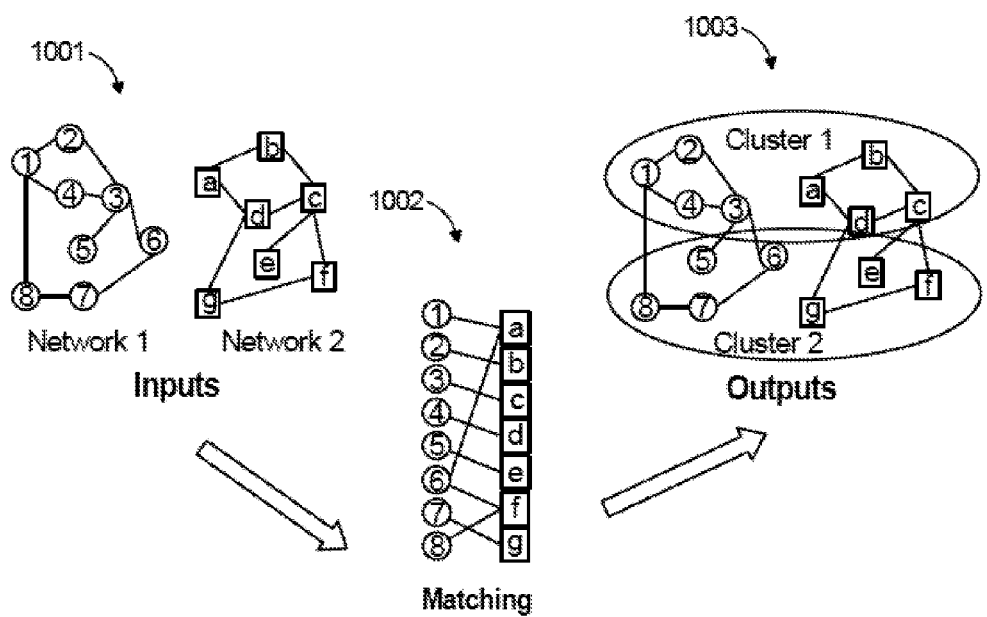
FIG. 10 is an illustration of a method for clustering/detecting clusters according to exemplary embodiments of the present disclosure.

In yet another exemplary implementation, cross-network clustering is performed (see FIG. 10). The cross-network clustering is performed by inferring the soft-correspondence between the input (>=two) networks 1001, integrating the target network and the auxiliary network 1002, and finding the clustering on the integrated networks 1003.

In another exemplary implementation, communities are detected across different populations (see again FIG. 10) by representing each population as a network/graphs 1001, inferring the soft-correspondence between the input (>=two) networks and integrating all the available networks/graphs 1002, and finding the clustering/communities on the integrated networks 1003.

Figure 11:
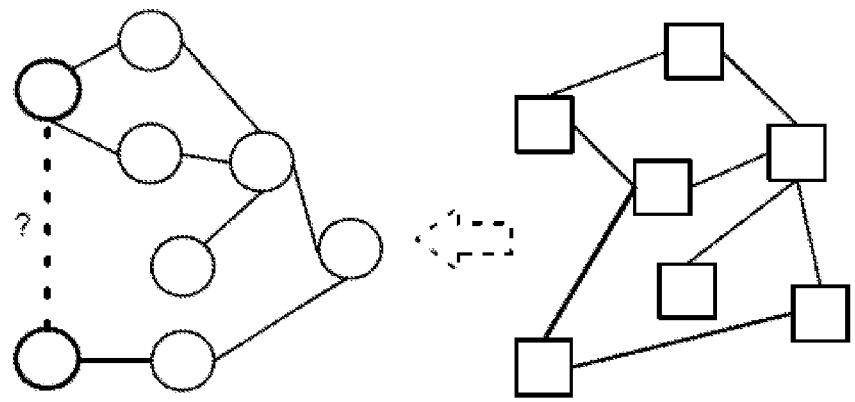
FIG. 11 is an illustration of a method for conducting cross-network link prediction according to exemplary embodiments of the present disclosure.

According to an exemplary embodiment of the present disclosure, a method for predictive cross-network data analytics includes cross-network link prediction by integrating a target network and an auxiliary network, finding a matched pair(s) (e.g., 1101) in the auxiliary network, extracting features for the matched pair(s), transferring the extracted features to a target pair of nodes in the target network, and predicting the existence of a link 1102 of the target pair (1103-1104) in the target network (see FIG. 11).

Advantages include being able to leverage denser/richer network structure to help link prediction in the target sparser network (i.e., migrate 'cold start' problem). Exemplary applications include the use of a mobility/proximity network to help friendship prediction in social networks; or vice versa.

Figure 12:
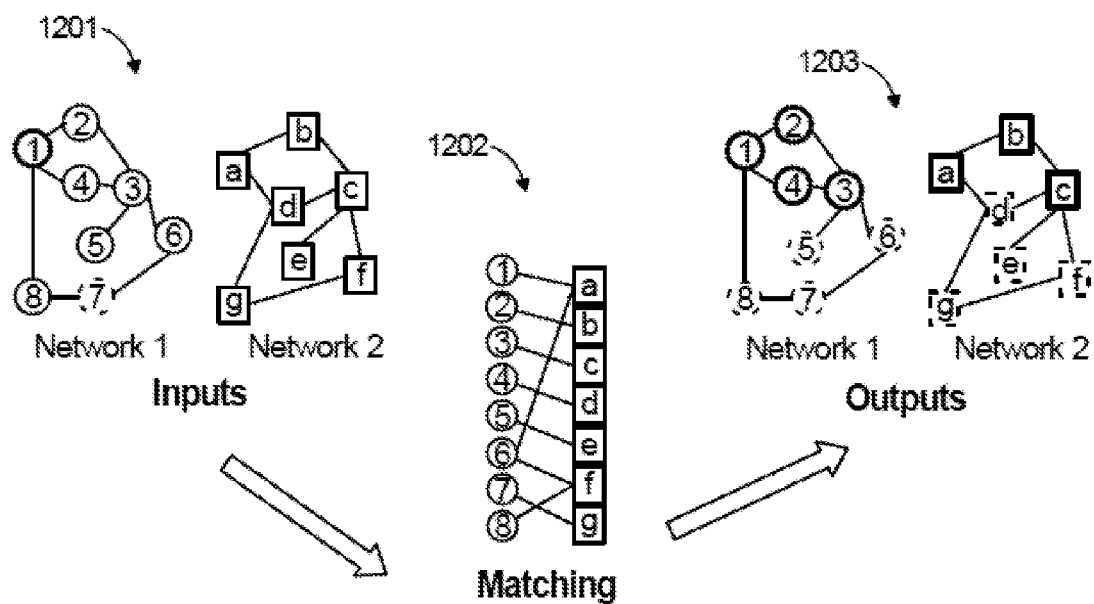
FIG. 12 is an illustration of a method for cross-network classification according to exemplary embodiments of the present disclosure.

In another exemplary implementation, cross-network classification (see FIG. 12) is performed by inferring the soft-correspondence 1202 between a popularity of input networks 1201, integrating the target network and the auxiliary network, building a classifier on the integrated networks, and predicting the labels for un-labeled nodes 1203.

In another exemplary implementation, the trust/distrust between a pair person in the target domain is predicted by representing the trust/distrust relationship in the target domain as the first trust network, representing the trust/distrust relationship from the auxiliary domain as the second trust network, conducting cross-network link prediction, and predicting the trust/distrust based on the existence of link of the target pair.

Here, the trust networks include nodes corresponding to the persons, and links corresponding to the trust relationship, where the absence of links corresponds to dis-trust.

The trust/distrust is predicted based on the existence of link of the target pair. The predicting is performed by predicting trust if the link between the target pair exists and predicting distrust if the link between the target pair does not exist.

In another exemplary implementation, fraud cross different domains is predicted by representing the data within each domain as a labeled network; conducting cross-network classification; and predicting the fraud based on the classification result. Here, a labeled network includes nodes corresponding to the users/accounts, links corresponding to the transaction relationship, positive node labels corresponding to the known frauds, and negative node labels corresponding to the known normal users. The prediction of fraud based on the classification result includes predicting fraud if the predicted class label is positive and predicting normal if the predicted class label is negative.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Furthermore, it should be noted that any of the methods described herein can include an additional step of providing a system for graph matching (see for example, FIG. 1) comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module that initializes two correspondence matrices (for example, FIG. 1: 101), a second module that minimizes a cost function w.r.t. a first correspondence matrix (see for example, FIG. 1: 103), a third module that minimizes a cost function w.r.t. a second correspondence matrix (see for example, FIG. 1: 104), a fourth module that updates a gradient descent (see for example, FIG. 1: 105), and a fifth module that tests for convergence of the gradient descent (see for example, FIG. 1: 106). Further, a computer program product can include a tangible computer-readable recordable storage medium with code adapted to be executed to carry out one or more method steps described herein, including the provision of the system with the distinct software modules.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 13:
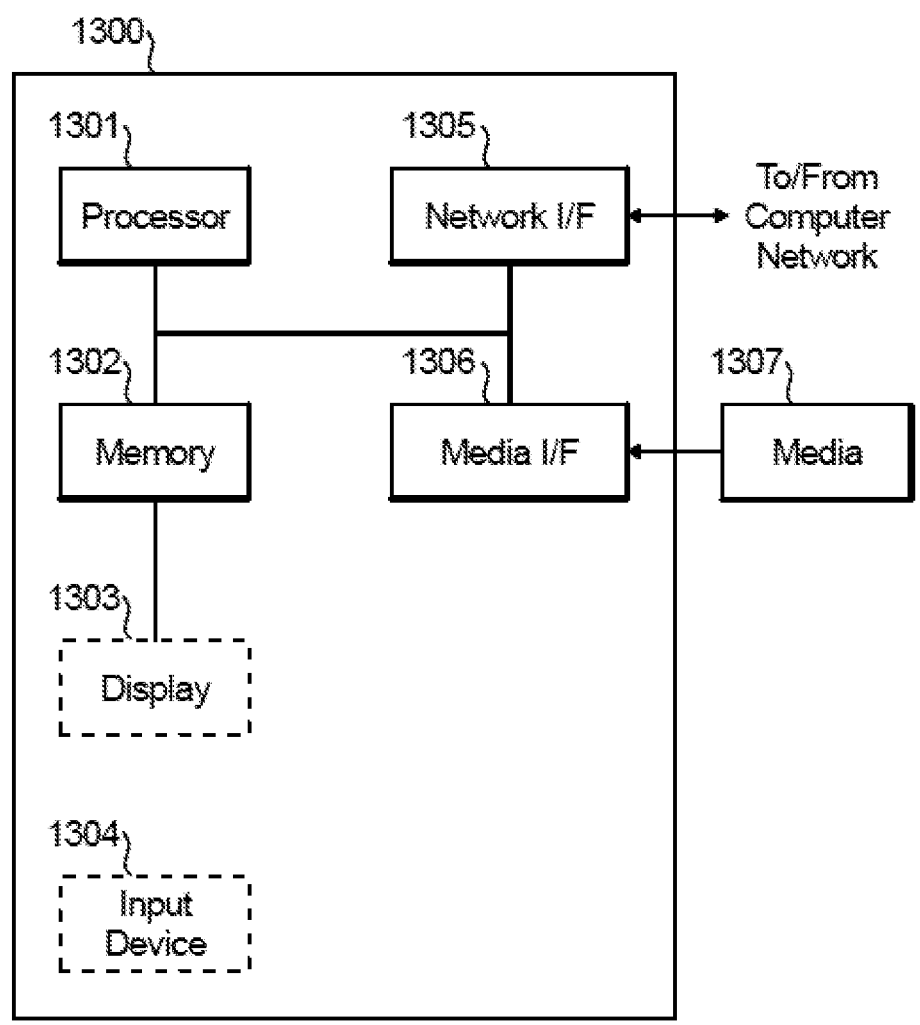
FIG. 13 is a diagram of a system configured to predict service delivery metrics according to an exemplary embodiment of the present disclosure.

For example, FIG. 13 is a block diagram depicting an exemplary computer system for graph matching according to an embodiment of the present disclosure. The computer system shown in FIG. 13 includes a processor 1301, memory 1302, display 1303, input device 1304 (e.g., keyboard), a network interface (I/F) 1305, a media IF 1306, and media 1307, such as a signal source, e.g., camera, Hard Drive (HD), external memory device, etc.

In different applications, some of the components shown in FIG. 13 can be omitted. The whole system shown in FIG. 13 is controlled by computer readable instructions, which are generally stored in the media 1307. The software can be downloaded from a network (not shown in the figures), stored in the media 1307. Alternatively, a software downloaded from a network can be loaded into the memory 1302 and executed by the processor 1301 so as to complete the function determined by the software.

The processor 1301 may be configured to perform one or more methodologies described in the present disclosure, illustrative embodiments of which are shown in the above figures and described herein. Embodiments of the present disclosure can be implemented as a routine that is stored in memory 1302 and executed by the processor 1301 to process the signal from the media 1307. As such, the computer system is a general-purpose computer system that becomes a specific purpose computer system when executing the routine of the present disclosure.

Although the computer system described in FIG. 13 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

The invention claimed is:

1. A non-transitory computer program product for building a soft linkage between a plurality of graphs, the computer program product comprising:
a computer readable storage medium having computer readable program code embodied therewith, the computer readable program code comprising:
computer readable program code configured to initialize a first-level correspondence between nodes of the plurality of graphs and a second-level correspondence between nodes of the plurality of graphs,
wherein the computer readable program code configured to initialize of the correspondences further comprises:
computer readable program code configured to sort, separately, the nodes of each of the plurality of graphs based on a degree distribution;
computer readable program code configured to determine a plurality of clusters, separately, the nodes of each of the plurality of graphs based on the sort; and
computer readable program code configured to initialize the first-level correspondence and the second-level correspondences uniformly between the plurality of graphs using the plurality of clusters;
computer readable program code configured to reduce a cost function by alternately updating the first level correspondence and updating the second-level correspondence,
wherein the computer readable program code configured to update the first-level correspondence comprises:
computer readable program code configured to fix the second-level correspondence;
computer readable program code configured to determine a gradient of the first-level correspondence; and
computer readable program code configured to update the first-level correspondence according to the gradient of the first-level correspondence; and
wherein the computer readable program code configured to update the second-level correspondence comprises:
computer readable program code configured to fix the updated value of the first-level correspondence;

computer readable program code configured to determine a gradient of the second-level correspondence using the updated value of the first-level correspondence; and computer readable program code configured to update the second-level correspondence according to the gradient of the second-level correspondence; and computer readable program code configured to build a matching graph between the plurality of graphs using the first-level and the second-level correspondences updated using the cost function.

2. The computer program product of claim 1, wherein the first-level correspondence and the second-level correspondence are each represented as a non-negative matrix whose entries are between 0 and 1.

3. The computer program product of claim 1, wherein the computer readable program code configured to update the second-level correspondence further comprises computer readable program code configured to match at least one community across multiple populations wherein the plurality of graphs corresponding to respective populations.

4. The computer program product of claim 1, wherein the plurality of graphs are a plurality of heterogeneous graphs, respectively, wherein the first-level correspondence is a correspondence between nodes of the plurality of graphs.

5. The computer program product of claim 1, wherein the plurality of graphs are a plurality of multi-relational data sets, respectively.

6. The computer program product of claim 1, wherein the plurality of graphs are a plurality of heterogeneous graphs, respectively, and further comprising computer readable program code configured to match entities and ontologies of the plurality of heterogeneous graphs based on structural representations thereof by finding a matching of the structural representations.

7. The computer program product of claim 6, wherein the structural representations include one of heterogeneous networks and multi-relational data.

8. The computer program product of claim 1, wherein the matching graph between the plurality of graphs is an integrated network and further comprising computer readable program code configured to perform a cross-network search comprising:

computer readable program code configured to perform the cross-network search on the integrated network.

9. The computer program product of claim 1, wherein the matching graph between the plurality of graphs is an integrated network and further comprising computer readable program code configured to perform a cross-network visualization comprising:

computer readable program code configured to display visualizing of the matching graph.

10. The computer program product of claim 9, wherein the computer readable program code configured to build the matching graph comprises:

computer readable program code configured to represent the first-level correspondence as nodes from a first network;

computer readable program code configured to represent the second-level correspondence as the nodes from a second network; and computer readable program code configured to determine a plurality of links by a correspondence matrix between the plurality of graphs.

11. The computer program product of claim 1, wherein the matching graph between the plurality of graphs is an integrated network and further comprising computer readable program code configured to find a clustering on the integrated networks.

12. The computer program product of claim 1, wherein the matching graph between the plurality of graphs is an integrated network and further comprising computer readable program code configured to detect communities across different populations represented by the plurality of graphs.

13. The computer program product of claim 1, further comprising computer readable program code configured to perform a cross-network link prediction comprising:

computer readable program code configured to integrate the plurality of graphs including a target network and an auxiliary network;

computer readable program code configured to find at least one matched pair of nodes in the auxiliary network;

computer readable program code configured to extract a plurality of features for the at least one matched pair of nodes;

computer readable program code configured to transfer the plurality of features to at least one target pair of nodes in the target network; and computer readable program code configured to predict a link between the target pair of nodes in the target network.

14. The computer program product of claim 1, wherein the plurality of graphs including a target network and an auxiliary network and further comprising computer readable program code configured to perform a cross-network classification comprising:

computer readable program code configured to integrate the target network and the auxiliary network into an integrated network;

computer readable program code configured to build a classifier on the integrated network; and computer readable program code configured to predict at least one label for a respective un-labeled node in the integrated network using the matching graph.

15. The computer program product of claim 1, further comprising computer readable program code configured to predict a level of trust between a pair person in a target domain comprising:

computer readable program code configured to represent a trust/distrust relationship in a target domain as a first trust network of the plurality of graphs;

computer readable program code configured to represent a trust/distrust relationship in an auxiliary domain as a second trust network of the plurality of graphs;

computer readable program code configured to perform a cross-network link prediction using the matching graph; and computer readable program code configured to predict the level of trust based on the cross-network link prediction of a target pair in the plurality of graphs.

16. The computer program product of claim 15, wherein the computer readable program code configured to predict the level of trust based on the cross-network link prediction of the target pair in the plurality of graphs comprises:

computer readable program code configured to predict trust if a link between the target pair exists using the matching graph; and computer readable program code configured to predict distrust if the link between the target pair does not exist.

17. The computer program product of claim 1, further comprising computer readable program code configured to predict a fraud cross different domains of the plurality of graphs comprising:
- computer readable program code configured to perform a classification across the plurality of graphs using the matching graph; and
- computer readable program code configured to predict a fraud based on a classification result.

18. The computer program product of claim 1, wherein the plurality of graphs are one of bipartite graphs and unipartite graphs.

19. A method for aligning a plurality of graphs, each of the plurality of graphs representing a network of objects, the method comprising:
- initializing, by a processor, a first-level correspondence between nodes of the plurality of graphs and a second-level correspondence between nodes of each of the plurality of graphs,
- wherein initializing of the correspondences further comprises:
  - sorting, separately, the nodes of each of the plurality of graphs based on a degree distribution;
  - determining a plurality of clusters, separately, the nodes of each of the plurality of graphs based on the sort; and
  - initializing the first-level correspondence and the second-level correspondences uniformly between the plurality of graphs using the plurality of clusters;
- reducing a cost function by updating, alternatively, by the processor, the first-level correspondence and the second-level correspondence,
- wherein updating the first-level correspondence comprises:
  - fixing the second-level correspondence;
  - determining a gradient of the first-level correspondence; and
  - updating the first-level correspondence according to the gradient of the first-level correspondence, and
- wherein updating the second-level correspondence comprises:
  - fixing the updated value of the first-level correspondence;
  - determining a gradient of the second-level correspondence using the updated value of the first-level correspondence; and
  - updating the second-level correspondence according to the gradient of the second-level correspondence;
- building a matching graph between the plurality of graphs using the first-level and the second-level correspondences updated using the cost function; and
- identifying, by the processor, at least one object of a first graph of the plurality of graphs matched to at least one object of a second graph of the plurality of graphs using the matching graph.

* * * * *